Oct. 29, 1929.  G. L. ERICSSON  1,733,684
DEVICE FOR OPENING TIN CANS AND THE LIKE
Filed Sept. 1. 1927
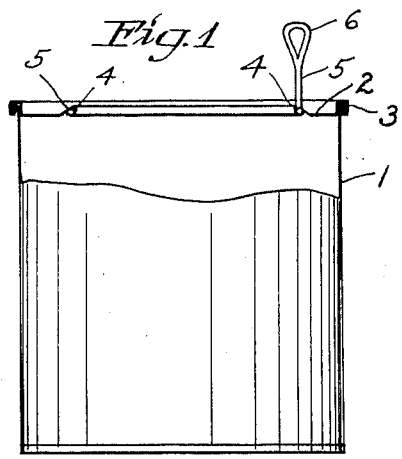
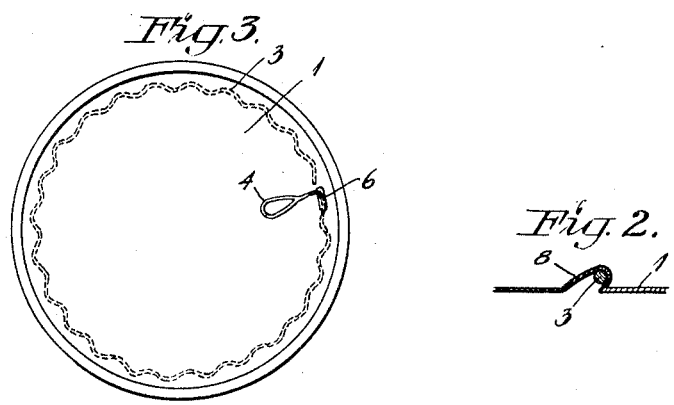

Patented Oct. 29, 1929

1,733,684

UNITED STATES PATENT OFFICE

GUSTAF LAMBERT ERICSSON, OF STOCKHOLM, SWEDEN, ASSIGNOR OF ONE-HALF TO LARS ERIK LARSSON, OF UPSALA, SWEDEN

DEVICE FOR OPENING TIN CANS AND THE LIKE

Application filed September 1, 1927, Serial No. 216,949, and in Sweden September 20, 1926.

The present invention has for its object to provide a device for opening tin cans for canned goods and the like. The device is founded on the feature of using a metal wire, preferably a steel wire secured in a groove shaped bulge or channel in an end cover of the can, as a cutting member for the opening or cutting of the can.

The invention is principally distinguished by the fact that the bulge or channel, which extends round the end cover, is some distance away from the wall of the tin and has such a cross sectional shape as to project on the outside of the end cover obliquely inwardly in order that the cutting wire, when pulled out, may not slip out of the bulge or channel in the said direction on the inside of the cover.

In the accompanying drawing, an embodiment of the invention is illustrated by way of example in which:

Fig. 1 is a vertical section of the upper part of a tin provided with the device according to the invention. Fig. 2 shows to a larger scale, a cross section of the bulge or channel, in which the cutting wire is inserted, and Fig. 3 discloses a special arrangement of the cutting wire.

1 is the tin and 2 the cover thereof, which latter is secured in known manner by means of the lap 3. Some distance inside this lap, the cover 2 is provided all around with the bulge or channel 4, in which the cutting wire 5 is inserted. According to the invention, the bulge or channel has such a cross sectional shape as to be directed with its bottom obliquely upwardly and inwardly, as shown in Fig. 1. The cutting wire 5 is enclosed in the bottom portion of the bulge or channel, and as the wire is pulled with the aid of a suitable tool introduced into the eyelet 6, the wire cannot slip inwardly out of the bulge or channel, but is securely retained therein, until the cutting operation is completed all around.

According to Fig. 3, the cutting wire 5 may be wave-shaped or folded so as to cut more effectively when pulled out.

What I claim as new and desire to secure by Letters Patent of the United States of America is:—

1. Means for opening tins or the like comprising a cutting wire, a groove-shaped bulge or channel in the end cover of the tin in which said cutting wire is placed, the bulge or channel extending around the end cover, in spaced relation to the wall of the tin and having a cross-sectional shape projecting on the outside of the end cover obliquely inwardly so that the cutting wire, when pulled, will not slip out of the bulge or channel.

2. Device according to claim 1 characterized by the fact that the cutting wire is wave-shaped so as to yield when pulled out and is thus caused to slide in the cut, thereby increasing the cutting effect.

In testimony whereof I affix my signature.

GUSTAF LAMBERT ERICSSON.